United States Patent [19]

Glehr

[11] Patent Number: 5,103,124

[45] Date of Patent: Apr. 7, 1992

[54] CONTROL DEVICE FOR CONTROLLING FUNCTIONS OF A MOTOR VEHICLE DURING A LOAD DUMP

[75] Inventor: Manfred Glehr, Eggenfelden, Fed. Rep. of Germany

[73] Assignee: Siemens Aktiengesellschaft, Berlin and Munich, Fed. Rep. of Germany

[21] Appl. No.: 492,305

[22] Filed: Mar. 7, 1990

Related U.S. Application Data

[63] Continuation-in-part of Ser. No. 263,390, Oct. 27, 1988, abandoned.

[30] Foreign Application Priority Data

Nov. 20, 1987 [DE] Fed. Rep. of Germany ....... 3739409

[51] Int. Cl.⁵ .......................................... H03K 5/153
[52] U.S. Cl. ................................. 307/517; 307/234; 307/363; 340/662; 361/91
[58] Field of Search ............... 307/272.3, 296.1, 296.4, 307/296.6, 234, 363; 340/662; 361/90, 91

[56] References Cited

U.S. PATENT DOCUMENTS 3,412,392 11/1968 Jenkins et al. ...................... 340/662
3,796,831 3/1974 Bauer ................................... 307/234
4,590,533 5/1986 Murata ..................................... 361/91
4,594,517 6/1986 Cohen et al. ...................... 307/296.4
4,611,126 9/1986 Miller .

FOREIGN PATENT DOCUMENTS 2454137 7/1980 France .
1136717 12/1968 United Kingdom .

Primary Examiner—John Zazworsky
Attorney, Agent, or Firm—Hill, Van Santen, Steadman & Simpson

[57] ABSTRACT

Control device for controlling functions of a motor vehicle for a load dump having a computer for generating at least one control signal that is dependent on the level of the operating voltage feeding the control device. A power supply system generates an operating voltage that is supplied to a threshold switch. As long as the operating voltage is above a limit value in the load dump case, the threshold switch outputs a response signal to an evaluator. The latter then only supplies an output signal and thus reports the load dump case to a computer unit when the response signal lasts longer than a set time span.

7 Claims, 3 Drawing Sheets

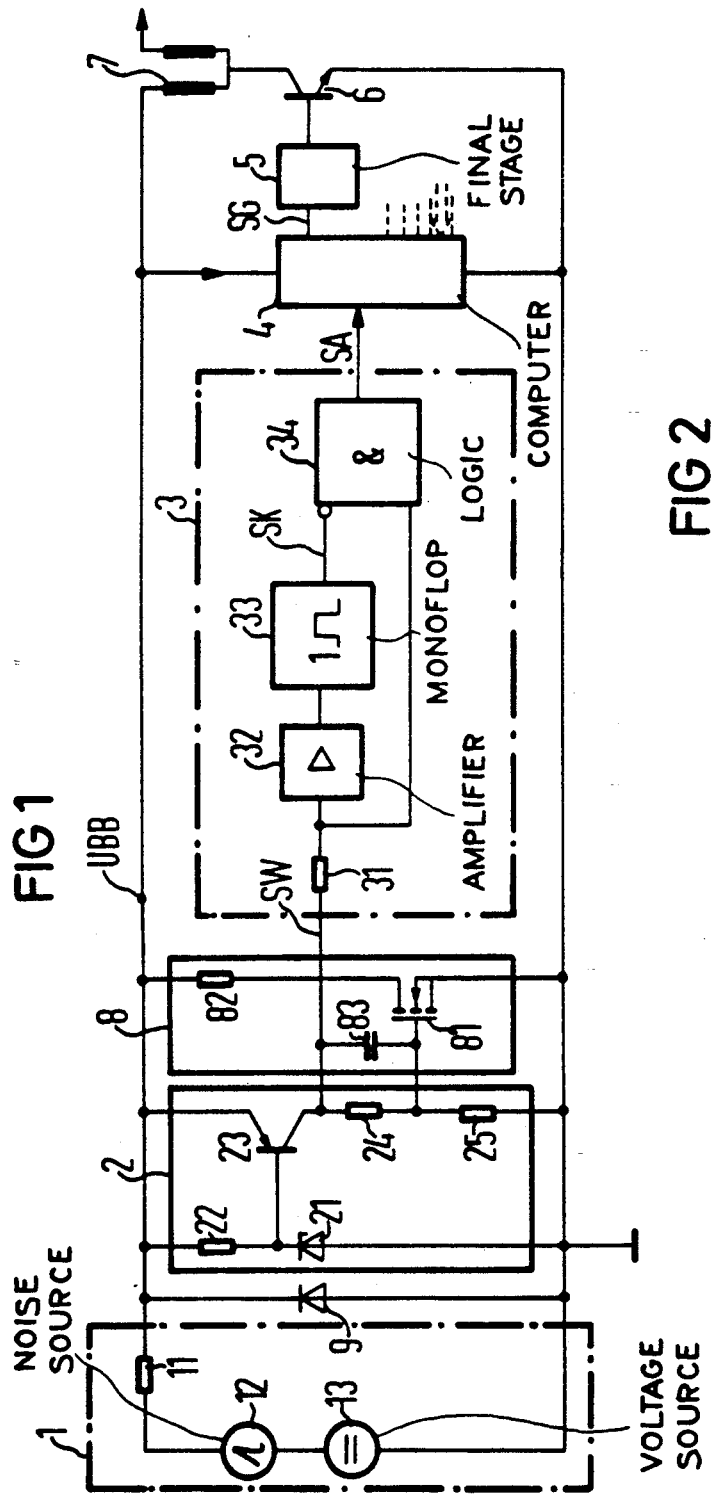

CONTROL DEVICE FOR CONTROLLING FUNCTIONS OF A MOTOR VEHICLE DURING A LOAD DUMP

This is a continuation-in-part of application Ser. No. 263,390, filed Oct. 27, 1988 (now abandoned.)

BACKGROUND OF THE INVENTION

The present invention is directed to a control device for controlling functions of a motor vehicle for a load dump. The device has a computer for generating at least one control signal that is dependent on the level of an operating voltage.

For example, such functions are the open time of an injection valve, the position of a throttle valve regulator and/or the charging time of an ignition coil. The length of the control signals controlling these units is dependent on the operating voltage applied to them in order to achieve a desired condition, such as quantity of fuel injected, position of the throttle valve or stored ignition energy, independently of the level of the operating voltage.

Since the operating voltage in a motor vehicle is supplied by a battery with a generator connected in parallel thereto and since the battery voltage can change only slowly, it has been sufficient for control devices with a computer to sense the operating voltage only from time to time and to base the calculation of the control signals on the value that was most recently sampled.

The present invention is based on the recognition that this procedure leads to unsatisfactory results under special operating conditions: namely, it can occur that the connection between the battery and generator is briefly or permanently broken. This then results in a significantly increased operating voltage for a sudden load dump whose size, among other things, is dependent on the speed of the generator (load dump). Since this operating situation is unpredictable but must be immediately taken into consideration, the computer would practically have to sense the operating voltage every millisecond. This, however, would result in a correspondingly costly design of the computer which however cannot be justified since the operating situations that have been described occur rarely.

SUMMARY OF THE INVENTION

An object of the present invention is therefore to immediately recognize a load dump without having to design the performance capability of the computer therefore. Further, the case of the load dump is to be distinguished from extremely short, non-critical increased levels of the operating voltage.

The control device of the present invention has a threshold switch to which the operating voltage is applied at an input side and that outputs a response signal as long as the operating voltage lies above a limit value. An evaluator is provided that is driven with the response signal and generates an output signal on which the control signal is dependent and that starts offset by a time span after the beginning of the response signal and ends with the response signal. A timer in the evaluator defines the time span such that it is longer than the response signal for short, non-critical levels of the operating voltage and is shorter than the response signal for the shortest load dump.

Without laying claim to the computer, the present invention provides an output signal only in the case of a load dump. A temporary disconnection of the control signal (SG) or an immediate sensing of the operating voltage and a recalculation of the control signal based thereon can thus then be initiated by the computer.

To this end, the output signal can initiate the normal control program or a special load dump routine during which the operating voltage is sensed at points in time that follow relatively quickly after one another and the last sample is used for the calculation of the control signals until the load dump has decayed. Otherwise, the computer calculates the curve of the operating voltage during the load dump, proceeding from the sample at the beginning of the load dump, according to a stored characteristic or an equation and uses the operating voltage values calculated in this fashion for calculating the control signals.

In the present invention, the output signal signaling a load dump is only generated when a real load dump is present and is not generated for only a brief, high noise voltage (noise pulse). A timer serves the purpose of distinguishing between these cases, this timer defining a time span whose length is selected such that it is longer than the duration of such non-critical noise pulses but is shorter than the duration of the shortest load dump that occurs. The latter is identified by measuring the conditions in a motor vehicle under real conditions. To this end, the duration during which the operating voltage occurs above a limit value due to a load dump is measured and the shortest of these times is selected.

The limit value preferably is at the upper tolerance limit of the normal operating voltage.

It is thereby especially advantageous to also switch a limiter on with the output signal, this limiter limiting the operating voltage at the units to a limit value that is permissible for them. Since brand-new vehicles are sometimes started with an auxiliary voltage source that supplies a higher operating voltage (referred to as a jump start), this limit value must be selected correspondingly higher, practically twice as great as the normal operating voltage.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 1 is a circuit diagram of an embodiment of the present invention wherein the output signal is supplied from an evaluator to a computer unit that controls a typical load circuit via a load switch;

FIG. 2 is a circuit diagram of an alternative to the evaluator of FIG. 1; and

DESCRIPTION OF THE PREFERRED EMBODIMENTS

Figure 3:
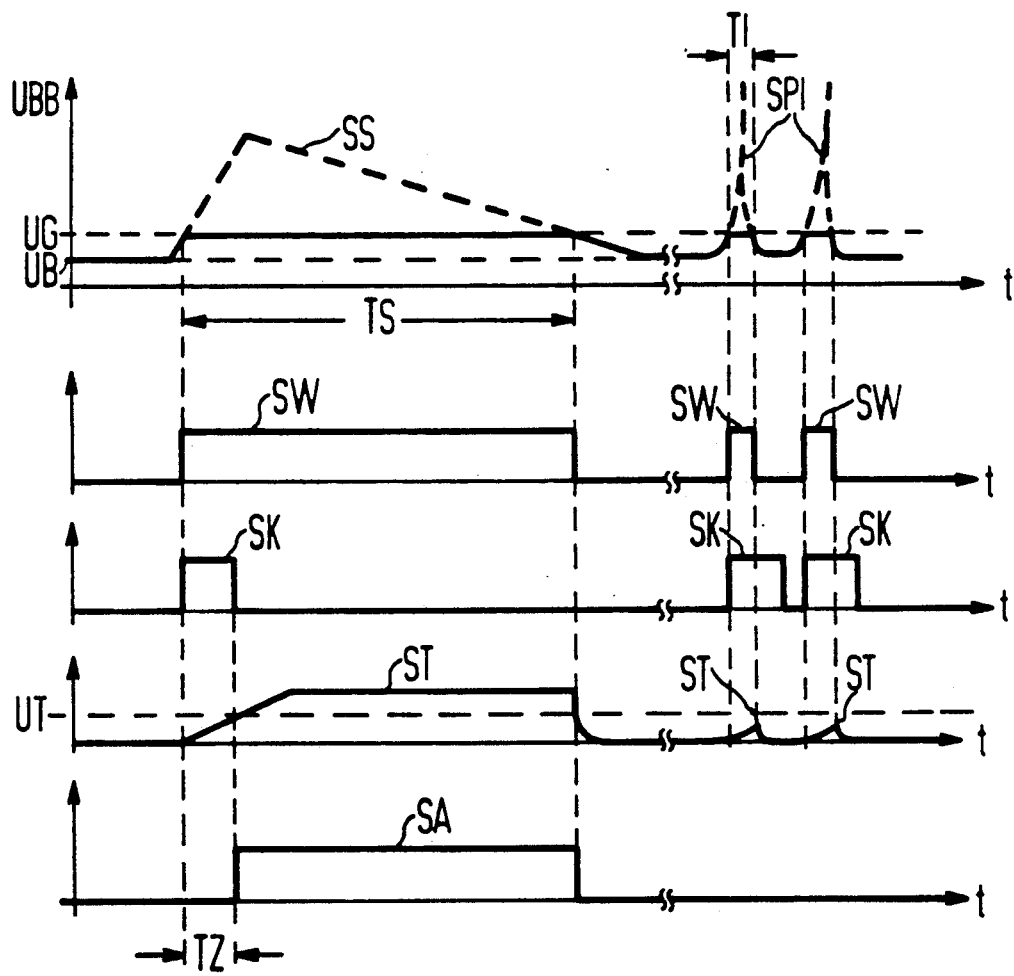
FIG. 3 is a signal diagram related to the functioning of the FIGS. 1 and 2 embodiment.

FIG. 3 shows a chronological curve of the limited operating voltage UBB. In the normal case, the operating voltage UBB has a normal value UB that is supplied by a voltage source 13 of a power supply system 1. (see FIG. 1).

The voltage source 13 is composed of a generator that is connected in parallel to a battery. In case of a malfunction, the connection between the battery and generator is interrupted. A load dump then results and the generator generates a load dump signal SS (entered in broken lines in FIG. 3 for unlimited operating voltage) whose amplitude can rise to 60–100 volts and can last a few hundred milliseconds. However in addition to this critical noise signal, brief, harmless noise pulses SPI (shown with broken lines in FIG. 3) also occur, for example, resulting from a windshield wiper motor, that can reach amplitudes of up to 200 volts but only last about 100 nanoseconds. A noise source 12 is indicated in FIG. 1 as a source of the noise signals.

The effective impedance value of the internal resistance 11 of the power supply system 1 normally amounts to only a few hundred milliohms. In case of a malfunction, however, it can amount from a few ohms up to a few hundred ohms depending on the range of the disturbances The illustrated load dump signal SS has exactly the calculated minimum signal duration TS. The noise pulse SPI has the calculated maximum pulse duration TI that is analogous to the calculation of the signal duration TS of the load dump signal SS.

Proceeding from the power supply system 1, the operating voltage UBB is supplied to a threshold switch 2, to a limiter 8, to a typical load circuit that has a user 7 and a load switch 6, and to a power diode 9 that suppresses the negative portions of the operating voltage UBB.

The threshold switch 2 has a first series branch having a drop resistor 22 and a Zener diode 21. A resistor 24, a resistor 25 and an emitter-collector path of a pnp transistor 23 are in the second series branch. The operating voltage UBB is supplied to both series branches. The control path of the pnp transistor 2 is connected in parallel to the drop resistor 22.

The limiter 8 has a limiter branch having a load resistor 82 and a self-inhibiting MOSFET 81 of the type whose drain-source channel lies in series with the load resistor 82. The MOSFET 81 has a fast switch behavior and a positive temperature coefficient that prevents an overload of the MOSFET 81. The gate-source path of the MOSFET 81 is connected in parallel to the resistor 25. A damping capacitor 83 that suppresses hunting is connected in parallel to the resistor 24.

The voltage drop across the resistors 24 and 25 is equal to the response signal SW that is supplied to the input side of the evaluator 3. The response signal SW is supplied to a logic element 34 via an input resistor 31 and is supplied to a mono-stable circuit of the timer 33 via an amplifier 32. With the beginning of the response signal SW, the monostable circuit emits a trigger signal SK at its output side whose duration corresponds to a time span TZ. The logic element 34 generates an output signal SA from the inverted trigger signal SK and from the response signal SW by an AND operation, this output signal SA being supplied to the reset input of a computer unit 4. The latter inhibits all control signals at its outputs as long as the output signal SA is present at the reset input. The computer unit 4 controls the load switch 6 with a control signal SG via a final stage 5.

Figure 4:
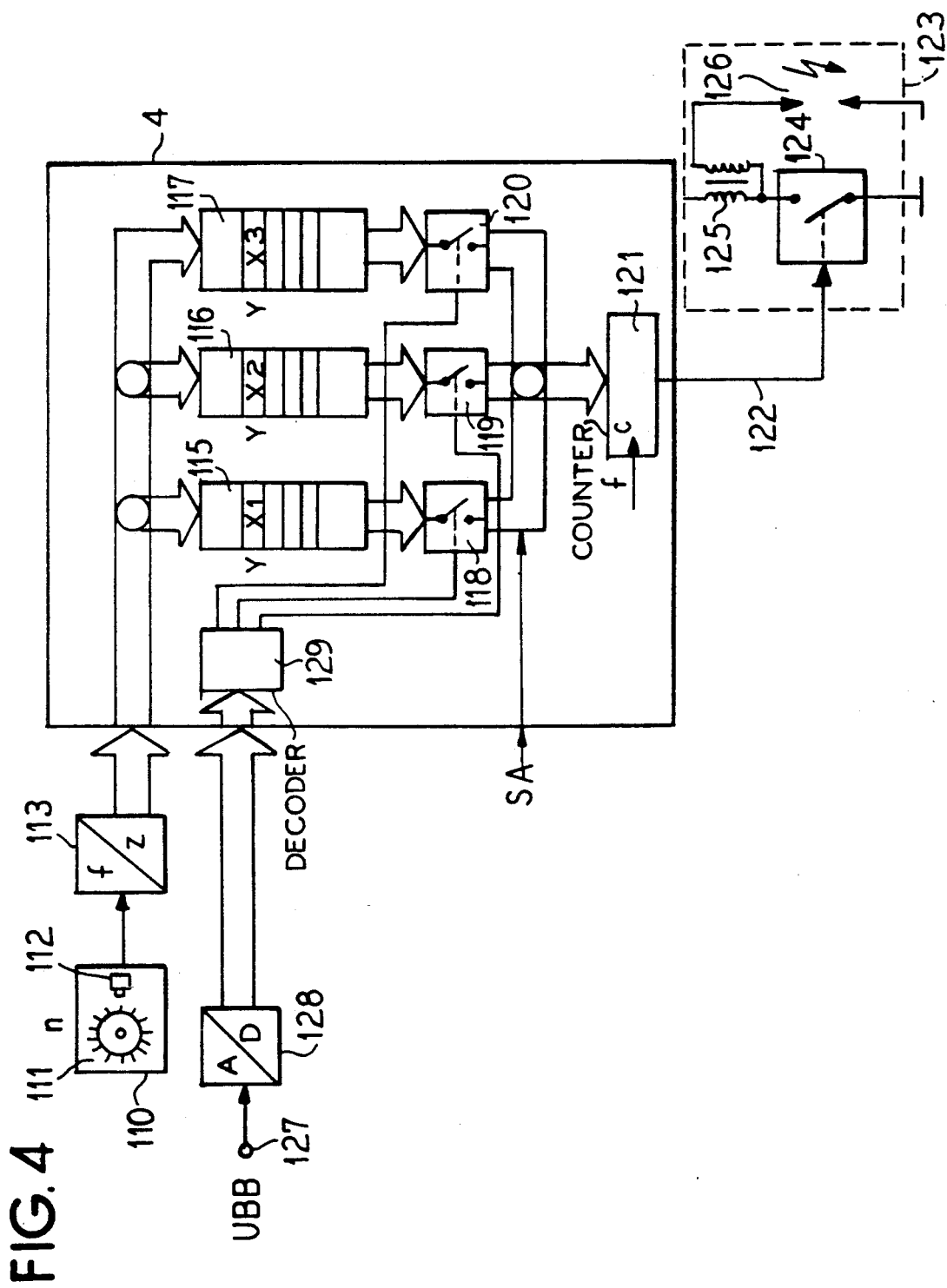
FIG. 4 is a circuit diagram depicting in more detail the computer in FIG. 1.

The computer 4 is shown in more detail in FIG. 4. In an internal combustion engine, a speed emitter arrangement 110 is composed of serrated rotating disk 111 preferably connected to the crankshaft of the internal combustion engine (not shown) whose tooth marks are sensed by a pick-up means 112. The output frequency that is generated is converted into a binary number in a following frequency-to-number converter 113 and is supplied to the computer 4. Any other speed acquisition that generates a speed-dependent numerical value, of course, is also possible instead of such a speed acquisition. Three parallel memory matrices 115, 116, 117, are selected in parallel in the computer 4 by this speed-dependent numerical value, whereby the speed-dependent numerical value respectively serves as an address. The selected memory contents are respectively supplied to a counter means 121 via switch devices 118, 119, 120, the counter means 121 having a counterclock frequency f. In this embodiment an instruction line 122 connects the counter mechanism 121 to an ignition output stage 123 that usually has an electronic switch 124 in the primary current circuit of an ignition coil 125 in whose secondary circuit at least one spark plug 126 is inserted. The electronic switch 124 is controlled via the instruction line 122.

The supply voltage UBB supplied to terminal 127 is also supplied to the computer 4 via an analog-to-digital converter 128. Therein, the binary value dependent on the supply voltage that is generated by the analog-to-digital converter 128 is decoded in a decoder means 129 and actuates one of the switches 118, 119, 120 dependent on this supply voltage UBB.

In the computer 4 a defined address y in each of the three memory matrices 115, 116, 117 is addressed for a defined speed n. These memory matrices are usually fashioned as read-only memories (ROM) whose plurality is defined by the storage capacity and by the plurality of information to be stored. For example, a characteristic that is required for a supply voltage of 10 volts is stored in the memory matrix 115, while a corresponding characteristic for 12 volts is stored in the memory matrix 116 and on for 14 volts is stored in the memory matrix 117.

Let it also be pointed out that, for example the decoder means 129 and the switch devices 118, 119, 120 in the computer 4 of course, are not present discretely per se. The selection of one of the memory values x1 through x3 occurs under program control, just as does the interrogation of the numerical value at the output of the analog-to-digital converter 128. A circuit-oriented realization, of course, is also conceivable as an alternative to the computer 4.

The computer 4 as shown in FIG. 4 controls the ignition time and the closed duration of the primary winding of the ignition coil 125. The beginning of the closed time is varied as a function of the battery voltage UBB. The computer 4 samples the battery voltage UBB for this purpose with an appropriate programming of the computer 4 and a signal that corresponds to the signal SG in FIG. 1 is output on line 122 to the electronic switch 124.

In the present invention, this computer 4 is programmed to sample the battery voltage at greater time intervals for no load dump than when a load dump occurs. When a load dump does occur, the signal SA is sent to the computer 4 wherein the computer 4 is programmed to sample the battery voltage UBB in every calculating cycle as long as the signal SA is present.

Many different microcomputers or microprocessors are available in the prior art for use as the computer 4.

The programming of such computers is also well known to those skilled in the art.

As long as the operating voltage UBB remains under the limit value UG, the Zener diode 21 is inhibited and the base of the pnp transistor 23 is at a high potential. The pnp transistor 23 is then inhibited and no response signal SW is generated. As long as the response signal SW is not present at the input side of the evaluator 3, it does not output an output signal SA to the computer unit 4.

When the operating voltage UBB reaches the limit value UG, the Zener diode 21 breaks down in the reverse direction and the pnp transistor 23 of the threshold switch 2 becomes conductive. A voltage drop that corresponds to the response signal SW therefore occurs at the resistor 24 and at the resistor 25.

With the start of the response signal SW the monoflop 33 outputs the trigger signal SK on its output, the duration thereof corresponding to the time span TZ that is between the pulse duration TI of the longest noise pulse SPI and the signal duration TS of the shortest load dump signal SS. When a load dump signal SS is present, the response signal SW is present at the logic element 34 longer than is the trigger signal SK. After the removal of the trigger signal SK, the logic element 34 thus outputs the output signal SA to the computer unit 4 until the end of the response signal SW. When, by contrast, the noise pulse SPI that only lasts a short time is present, the response signal SW will already be removed from the input of the logic element 34 during the duration of the trigger signal SK, i.e., during the time span TZ, the logic element 34 then not outputting an output signal SA.

As soon as the output signal SA is present at the computer unit 4, the latter removes the control signal SG at its output and the load switch 6 in the load circuit is opened.

With the beginning of the response signal SW, the MOSFET 81 is driven by the voltage drop across the resistor 25 and a current flows through the load resistor 82 of the limiter 8. The voltage drop across the load resistor 82 and the drain-source voltage at the MOSFET 81 together are of the same size as the limit value UG. The operating voltage UBB (see FIG. 3) is thus limited to the limit value UG. In the limiting case, a considerably greater voltage drop occurs across the load resistor 82 than across the MOSFET 81, the latter being thereby considerably relieved.

FIG. 2 shows an evaluator 3.1 that has a timer 33.1 and a switch 35 and to which the response signal SW is supplied at the input side via an input resistor 31.

The timer 33.1 has a RC element composed of a timer capacitor 33.11 and a resistor 33.12 that is connected to the timer capacitor 33.11 and to the switch 35. The RC-element is followed by a Schmitt trigger 33.13 that has a trigger threshold UT. The switch 35 is composed of the two series-connected inverters 351, 352.

When the response signal SW appears at the input of the evaluator 3.1, the timer capacitor 33.11 is charged to a trigger voltage ST via the resistor 33.12 and this trigger voltage ST is supplied to the Schmitt trigger 33.13. The time span TZ is defined by the duration that the trigger voltage ST requires in order to reach the trigger threshold UT of the Schmitt trigger 33.13 beginning from 0. The Schmitt trigger 33.13 outputs the output signal SA (FIG. 3) as long as the trigger voltage ST is above the trigger threshold UT. When the response signal SW is removed from the input of the evaluator 3.1, the inverter 352 discharges the timer capacitor 33.11 via the resistor 33.12. The inverter 352 keeps the timer capacitor 33.11 in its discharged condition as long as no response signal SW is present at the evaluator 3.1.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A control device for effecting control of functions of a motor vehicle in case of a load dump, the motor vehicle having a power supply system that provides an operating voltage, and a computer for generating at least one control signal for controlling said functions, comprising:

a threshold switch to which the operating voltage is applied to an input side and that outputs a response signal for a response time interval during which the operating voltage is above a limit value;

an evaluator that is driven with the response signal and that generates an output signal, said evaluator having a timer that receives the response signal and that outputs a trigger signal having a predetermined time interval in response to the response signal, and said evaluator having a logic element for outputting an output signal to the computer, the logic element receiving the trigger signal on a first input thereof and receiving the response signal on a second input thereof, the logic element outputting the output signal during a time span that begins at an end of the predetermined time interval of the trigger signal and that ends at an end of the response time interval of the response signal when the response time interval is greater than the predetermined time interval;

wherein the predetermined time interval of the trigger signal is greater than the response time interval of the response signal for short, non-critical increased levels of the operating voltage, the logic element thereby not outputting the output signal, and wherein the predetermined time interval of the trigger signal is less than the response time interval of the response signal for an increased level of the operating voltage that causes a load dump, the logic element thereby outputting the output signal.

2. The control device according to claim 1, wherein the evaluator has:

a monostable circuit as the timer that is set with the start of the response time interval of the response signal and that supplies the trigger signal during the predetermined time interval; and the logic element outputting the output signal as long as the response signal is present after the end of the predetermined time interval of the trigger signal.

3. The control device according to claim 1, wherein the control device further comprises a limiter, this limiter being driven by the response signal and limiting the operating voltage to a limit value.

4. The control device according to claim 3, wherein, the limiter has a limiter branch having a field effect transistor;

the threshold switch has a first series branch having a drop resistor and a Zener diode and has a second series branch having a first transistor and at least a second resistor;

both series branches and the limiter branch being connected to the operating voltage; and a control path of the field effect transistor being connected in parallel to the second resistor and the control path of the transistor being connected in parallel to the drop resistor.

5. The control device according to claim 4, wherein a pnp transistor is utilized as the first transistor and a self-inhibiting n-MOSFET is utilized as the field effect transistor.

6. The control device according to claim 5, wherein a load resistor is located in the limiter branch in series with the drain-source path of the field effect transistor.

7. A control device for effecting control functions of a motor vehicle in case of a load dump, the motor vehicle having a power supply system that provides an operating voltage, and a computer for generating at least one control signal for controlling said functions, comprising:

a threshold switch to which the operating voltage is applied at an input side and that outputs a response signal for a response time interval during which the operating voltage is above a limit value;

an evaluator that is driven with the response signal and that generates an output signal, the evaluator having a switch and having a RC-element with a following Schmitt trigger as a timer whereby the RC-element has a first resistor and a timer capacitor and the Schmitt trigger has a trigger threshold;

the response signal being supplied to the switch that charges the timer capacitor via the first resistor with the beginning of the response time interval of the response signal and that discharges the timer capacitor via the first resistor with the end of the response time interval of the response signal; and a trigger voltage at the timer capacitor being supplied to the Schmitt trigger that outputs the output signal as long as the trigger voltage is higher than the trigger threshold;

wherein the trigger voltage is lower than the trigger threshold for short, non-critical increased levels of the operating voltage, the Schmitt trigger thereby not outputting the output signal, and wherein the trigger voltage is higher than the trigger threshold for an increased level of the operating voltage that causes a load dump, the Schmitt trigger thereby outputting the output signal.

* * * * *